D. D. PETRE.
KNIFE RACK.
APPLICATION FILED MAY 27, 1914.
1,157,578.
Patented Oct. 19, 1915.
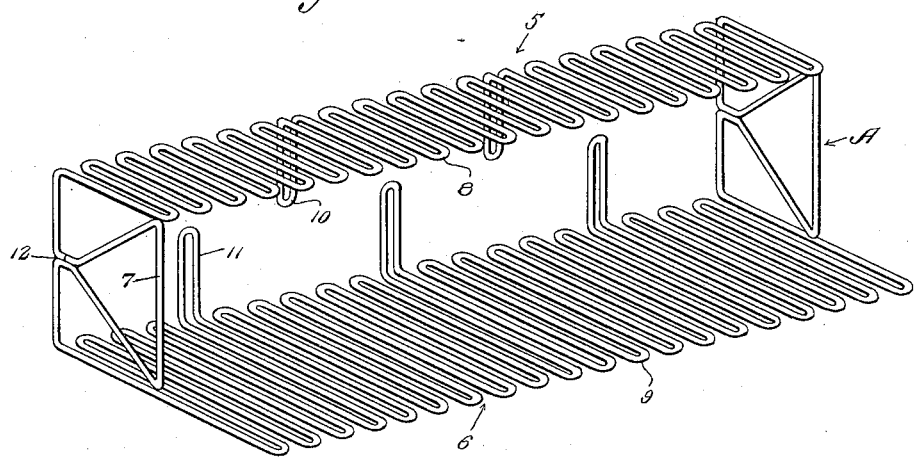
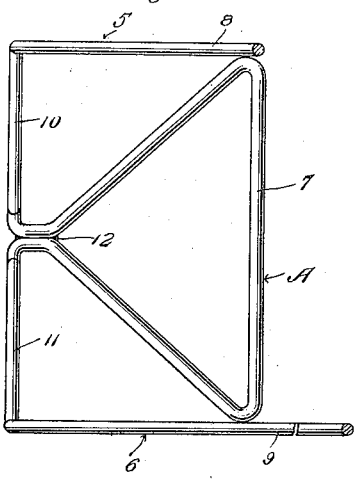 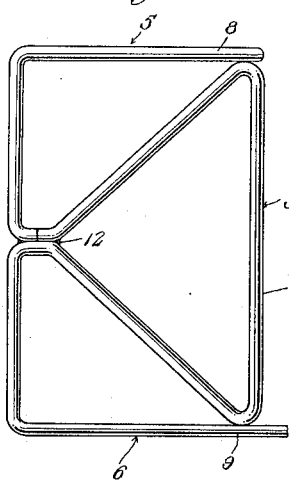 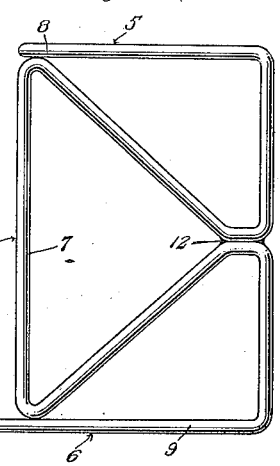

UNITED STATES PATENT OFFICE.

DAISY D. PETRE, OF OMAHA, NEBRASKA.

KNIFE-RACK.

1,157,578.

Specification of Letters Patent. Patented Oct. 19, 1915.

Application filed May 27, 1914. Serial No. 841,374.

*To all whom it may concern:*

Be it known that I, DAISY D. PETRE, a citizen of the United States, residing at Omaha, in the county of Douglas and State of Nebraska, have invented new and useful Improvements in Knife-Racks, of which the following is a specification.

The invention relates to racks, and more particularly to the class of knife racks.

The primary object of the invention is the provision of a rack wherein a variety of knives can be conveniently held ready for immediate use, and thus avoid the dulling of the knives by the possible contact of their cutting edges when placed within the drawer of a kitchen cabinet or a tray as is usual.

Another object of the invention is the provision of a rack wherein the variety of knives will be held assorted so that the large and small knives can be readily distinguished from each other.

A further object of the invention is the provision of a rack which is of novel form to render it simple in construction, durable, and efficient in its purpose, and inexpensive in manufacture.

With these and other objects in view, the invention consists in the construction, combination and arrangement of parts as will be hereinafter fully described, illustrated in the accompanying drawing, and pointed out in the claim hereunto appended.

In the drawing:—Figure 1 is a perspective view of a rack constructed in accordance with the invention. Fig 2 is a vertical transverse sectional view thereof. Fig. 3 is an end elevation. Fig. 4 is a view similar to Fig. 3, looking toward the opposite end of the rack.

Similar reference characters indicate corresponding parts throughout the several views in the drawing.

Referring to the drawing in detail, the knife rack comprises upper and lower similarly bent horizontally disposed sinuous stretches 5 and 6, and triangular shaped end brace frames 7, the same being bent from a single strand of relatively stiff wire A. The sinuous upper stretch 5 forms a series of alternate reversely extended open loops 8 which are uniform throughout and of a width considerably less than the alternate reversely extended open loops 9 of the lower sinuous stretch 6 of the rack, and in these loops 8 and 9 of both stretches are adapted to be held knives of a variety which may be assorted relative to the sizes thereof.

A pair of spaced loops 8 in the upper sinuous stretch 9 are formed with extensions 10 which are at right angles thereto at the inner side of the rack, while formed on three of the spaced loops 9 of the lower stretch 6 are extensions 11 which are at right angles thereto, and in these extensions are inserted suitable fasteners such as screws or nails for the mounting of the rack upon a support or vertical wall for use in holding knives.

The ends 7 are joined to the outer extremities of the stretches 5 and 6 in any suitable manner, and preferably in this instance by the use of solder, as at 12, so that the stretches 5 and 6 will not become displaced from their relative positions with respect to each other.

From the foregoing it is thought that the construction of the device will be clearly undestood, and therefore a more extended explanation has been omitted.

What is claimed is:—

A knife rack formed of a single strand of relatively stiff wire, comprising upper and lower sinuous stretches, the lower stretch being of greater width than the upper stretch, triangular shaped end frames bent from said strand whereby the upper and lower stretches are braced in parallelism, and extensions formed on certain of the loops of the sinuous stretches and bent at right angles thereto for the reception of fasteners.

In testimony whereof I affix my signature in presence of two witnesses.

DAISY D. PETRE.

Witnesses:
ROBERT HUNTER,
EDGAR S. MORRIS.

Copies of this patent may be obtained for five cents each, by addressing the "Commissioner of Patents, Washington, D. C."